United States Patent
Lavarec et al.

(10) Patent No.: US 6,859,847 B2
(45) Date of Patent: Feb. 22, 2005

(54) PARALLEL ELECTRONIC ARCHITECTURE COMPRISING A PLURALITY OF PROCESSING UNITS CONNECTED TO A COMMUNICATION BUS, AND ADDRESSABLE BY THEIR FUNCTIONAL CAPABILITIES

(75) Inventors: Erwan Lavarec, Montpellier (FR); Laurent Tremel, Castelnau le Lez (FR)

(73) Assignee: Wany S.A., Clapiers (FR)

( * ) Notice: Subject to any disclaimer, the term of this patent is extended or adjusted under 35 U.S.C. 154(b) by 56 days.

(21) Appl. No.: 10/451,032

(22) PCT Filed: Dec. 21, 2001

(86) PCT No.: PCT/FR01/04176

§ 371 (c)(1),
(2), (4) Date: Jun. 18, 2003

(87) PCT Pub. No.: WO02/052414

PCT Pub. Date: Jul. 4, 2002

(65) Prior Publication Data

US 2004/0059888 A1 Mar. 25, 2004

(30) Foreign Application Priority Data

Dec. 22, 2000 (FR) .......................................... 00 16858

(51) Int. Cl.$^7$ ............................................... G06F 3/00
(52) U.S. Cl. ......................................... 710/20; 710/30
(58) Field of Search ............................ 710/20, 21, 30; 709/200, 223

(56) References Cited

U.S. PATENT DOCUMENTS

| 5,841,580 A | 11/1998 | Farmwald et al. |
| 5,898,845 A | 4/1999 | Frantz et al. |
| 6,625,689 B2 * | 9/2003 | Narad et al. ................. 711/110 |
| 6,687,766 B1 * | 2/2004 | Casper et al. ................. 710/20 |
| 6,690,676 B1 * | 2/2004 | Gulick ........................ 370/458 |
| 6,714,539 B1 * | 3/2004 | Sbisa ......................... 370/385 |
| 6,725,281 B1 * | 4/2004 | Zintel et al. ................. 719/318 |

FOREIGN PATENT DOCUMENTS

EP 0200447 A2 5/1986

* cited by examiner

Primary Examiner—Jeffrey Gaffin
Assistant Examiner—Harold Kim
(74) Attorney, Agent, or Firm—Cohen, Pontani, Lieberman & Pavane (57) ABSTRACT

The parallel electronic architecture comprises a plurality of processor units connected to a communication bus and each adapted to execute one or more predefined tasks automatically. Each processor unit is configured so that each of its tasks is associated with a header, each processor unit is adapted to communicate with the other processor units using the following protocol: sending on the bus a message including a header characterizing a function, and possibly a frame consisting of one or more words, and each processor unit is adapted to decode each header on the bus and, as a function of the value of said header, either to ignore the message on the bus or to execute the task associated with the header of said message.

10 Claims, 4 Drawing Sheets

PARALLEL ELECTRONIC ARCHITECTURE COMPRISING A PLURALITY OF PROCESSING UNITS CONNECTED TO A COMMUNICATION BUS, AND ADDRESSABLE BY THEIR FUNCTIONAL CAPABILITIES

PRIORITY CLAIM

This is a U.S. National stage of application No. PCT/FR01/04176, filed on 21 Dec. 2001. Priority is claimed on that application and on the following application: Country: France, Application No.: 00/16858, Filed: 22 Dec. 2000.

FIELD OF THE INVENTION

The field of the present invention is that of parallel (multiprocessor and multitasking) electronic architectures. It consists of an architecture comprising a plurality of processor units connected to a communication bus and communicating with each other using a new protocol.

BACKGROUND OF THE INVENTION

In the present text, the term "processor unit" refers to any machine adapted to execute one or more distinct tasks automatically. It can be a hard-wired processor unit. It is preferably a programmable processor unit including a processor (microprocessor, microcontroller, etc.) programmed to execute one or more distinct tasks automatically. The processor unit can be programmable machine, such as a microcomputer, for example, a peripheral of a machine, a daughter card mounted on a backplane mother card, etc. This list is not exhaustive.

At present, in electronic architectures comprising a plurality of processor units interconnected by a communication bus, each processor unit is identified on the bus by a physical address that is specific to it. Existing communication protocols enable a first processor unit (referred to hereinafter as the sender unit) to communicate with a second processor unit (referred to hereinafter as the target unit). Accordingly, when the sender unit sends a message to the target unit, for example to trigger the execution of a predefined task by the target unit, the sender unit sends the address of the target unit on the bus. Each processor unit is able to decode an address sent on the bus and if a target unit recognizes its own address it loads the associated message into local memory and executes the task for which it is programmed. The target unit and the sender unit generally have similar fixed size address and data buses.

With existing architectures and communication protocols of the above types, it is difficult to produce a multitasking system in which a plurality of processor units execute the same task (or function) in parallel, because this kind of parallel working of the processor units necessitates complex management of processor unit addressing.

OBJECTS AND SUMMARY OF THE INVENTION

The present invention aims to propose a new parallel architecture that alleviates this drawback, and which is also of modular design and easier to modify by adding a new processor unit or replacing or removing a processor unit.

The above object is achieved by the parallel architecture of the invention, which is known to the person in the art to the extent that it comprises a parallel electronic architecture including a plurality of processor units connected to a communication bus and each adapted to execute one or more predefined tasks automatically.

In a novel manner that is characteristic of the invention, each processor unit is configured so that each of its tasks is associated with a header, each processor unit is designed to communicate with the other processor units using the following protocol: sending on the bus a message comprising a header characterizing a function, and possibly a frame consisting of one or more words, and each processor unit is adapted to decode each header on the bus and, as a function of the value of said header, either to ignore the message on the bus or to execute the task associated with the header of said message.

Accordingly, the operation of the architecture of the invention is based on a new principle, that of sending the address of a function on the communication bus rather than the address of a given target processor unit. Thus, in accordance with the invention, the header that characterizes a function activates all connected processor units that recognize the function so that those processor units execute in parallel the task associated with the function.

BRIEF DESCRIPTION OF THE DRAWINGS

Other features and advantages of the invention become more clearly apparent on reading the following description of a preferred embodiment of the invention, which is given by way of non-limiting example and with reference to the appended drawings, in which.

DETAILED DESCRIPTION OF THE PRESENTLY PREFERRED EMBODIMENTS

Figure 1:
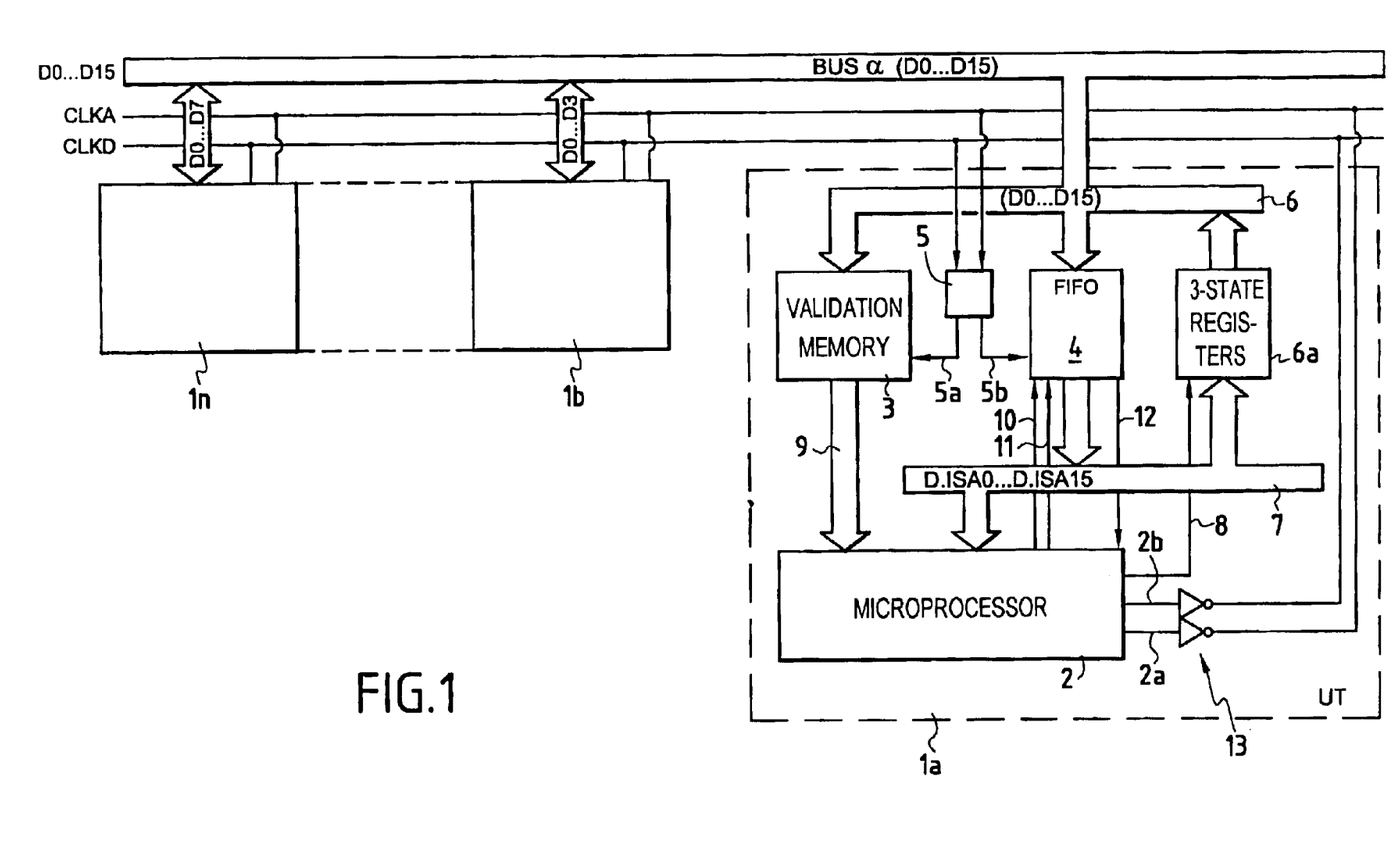
FIG. 1 is a general block diagram of one example of a multimaster/multislave architecture of the invention with a plurality of processor units connected to a 16-bit (D0–D15) parallel bus α.

Referring to the general block diagram of FIG. 1, an architecture of the invention comprises a plurality of processor units 1a, 1b, . . . , 1n which are connected to a parallel data bus α.

The FIG. 1 architecture is advantageously a multimaster/multislave architecture. If one of the processor units 1a, 1b, . . . , 1n wishes to send a message on the bus α, it takes control of the bus and becomes the master unit, and the other units become slave units. When its message has been sent on the bus, the master processor unit releases the bus so that another processor unit can take control of the bus α to send a message. This mode of operation implies the use of means for arbitrating access to the bus in write mode, which arbitrator means receive at their input from each processor unit signals requesting access to the bus in write mode and deliver at their output for each processor unit signals authorizing access to the bus in write mode. Arbitrator means are well known to the person skilled in the art, and for this reason they are not shown in FIG. 1 and are not described further in the present text.

The invention is not limited to an architecture of the multimaster/multislave type, but can equally well be applied, for example, to an architecture with only one master processor unit able to write on the bus, the other processor units always being slave units able only to read the bus.

Definitions of Principal Terms

Bus α

The bus α is a data bus comprising q parallel electrical conductors, where q is an integer greater than or equal to 1. In the example shown in FIGS. 1 and 2, the bus α is a 16-bit bus and comprises 16 parallel electric conductors (D0–D15).

Atom of Granularity (AG)

The atom of granularity (AG) corresponds to the smallest size of a processor unit that can communicate on the bus α (see also the definition given below of the term "color"). Since the bus α generally comprises q parallel electrical conductors, where q is an integer greater than or equal to 1, $q=AG.2^p$. The value of AG is necessarily a power of 2.

Color of a Processor Unit

The "color" of a processor unit is defined by the size (expressed as a number of bits) of its data bus. In the FIG. 1 example, the processor unit 1a is a 16-bit machine (data bus D0–D15), the processor unit 1b is a 4-bit machine (data bus D0–D3), and so on up to the processor unit 1n, which is an 8-bit machine (data bus D0–D7).

Hereinafter, the "colors" of a processor unit are denoted A, B, C, D, etc., in accordance with the following convention: a processor unit able to communicate on only one AG is of color A, a processor unit able to communicate on a maximum of two AG is of color B, a processor unit able to communicate on a maximum of four AG is of color C, a processor unit able to communicate on a maximum of eight AG is of color D, and so on.

Word

A word corresponds to the value on the bus α at any given time. The maximum size of a word is limited by the number of parallel conductors of the bus α.

Message

A message corresponds to a succession of words written in series on the bus α by a processor unit. A message comprises a first word which constitutes a header (FunctionKey), followed by a frame which, in the serial format used, comprises one or more successive words.

Serial Format (FS)

The serial format defines all the words that constitute a message in transit on the bus. Very different serial formats can be used on the bus α, and necessarily have the common feature that the first word of a message is a header.

One example of a standard serial format, which is not limiting on the invention, is given below:

| Header (FunctionKey) | (see definition below) |
|---|---|
| (Size of message) | (after FunctionKey), a number |
| (Signature) | (after FunctionKey), explains type of master that is sending and its position on the bus |
| (Type) | (after FunctionKey), a number |
| (Frame size) | (after FunctionKey), a number |
| Frame | (after FunctionKey), N words in succession |
| Sentinel | control bits on all words of the message, for determining if an error has occurred in one of the transmission bits |

Depending on the function, as coded by the header, other serial formats can be derived from the above standard format, the simplest serial format with transmission monitoring being: header/sentinel. In an even simpler embodiment that can be envisaged (with no check on the integrity of the data transmitted), a message can consist only of a header.

Parallel Format (FP)

Each processor unit color (A, B, C, D, etc.) is associated with a particular format of messages in transit on the bus α.

One example of coding the parallel format (FP) is given the table below:

| | | | Header on the bus α | | | | | |
|---|---|---|---|---|---|---|---|---|
| 1st AG | 2nd AG | 3rd AG | 4th AG | 5th AG | 6th AG | 7th AG | 8th AG | parallel format |
| XXXX | 0 | 0 | 0 | 0 | 0 | 0 | 0 | FP-A: $2^{AG}$ Functions |
| 0 | XXXX | 0 | 0 | 0 | 0 | 0 | 0 | FP-B: $2^{AG}$ Functions |
| 0 | 0 | XXXX | XXXX | 0 | 0 | 0 | 0 | FP-C: $2^{8.AG}$ Functions |
| 0 | 0 | 0 | 0 | XXXX | XXXX | XXXX | XXXX | FP-D: $2^{4.AG}$ Functions |
| | | | ... | | | | | ... |
| XXXX | XXXX | 0 | 0 | 0 | 0 | 0 | 0 | FP-AB |
| XXXX | 0 | XXXX | XXXX | 0 | 0 | 0 | 0 | FP-AC |
| XXXX | 0 | 0 | 0 | XXXX | XXXX | XXXX | XXXX | FP-AD |
| XXXX | 0 | XXXX | XXXX | XXXX | XXXX | XXXX | XXXX | FP-ACD |
| | | | ... | | | | | |

XXXX indicates that AG can take any available value. A 0 indicates that all the conductors of that AG are at 0.

Form of Each FP

FP-A: the AG of the first conductors of the bus are used for all the other words that thereafter constitute the frame of the message. Thus all the processor units connected to the bus and having the required function are addressed, since by definition even the smallest processor unit can communicate on one AG.

FP-B: the first 2AG conductors of the bus are used for all the other words that thereafter constitute the frame of the message. By definition, this excludes the processor units that are not capable of accessing the bus, since they are not able to decode the XXXX on the second AG anyway. Necessarily only machines capable of communicating on two AG are addressed.

FP-C: the first 4AG conductors of the bus are used for all the other words that thereafter constitute the frame of the message.

FP-D: the first 8AG conductors of the bus are used for all the other words that thereafter constitute the frame of the message.

Combined formats (FP-AB, FP-AC, FP-AD, FP-ACD, etc.) provide more refined (more detailed) data if the processors concerned can read data on more than one AG.

Example of the use of the mixed formats FP-AB and FP-AD:

The format FP-AB addresses processor units that can read on one AG and processor units that can read on two AG. Those that read on one AG have sufficient information to execute the function but do not necessarily have all the details. Those which read on two AG can have an error corrector code on the second AG, for example, for verifying the information in the first AG.

The FP-AD format can be useful for transmitting small images on the bus α, for example. The first AG can be used to code the average gray (or color) level of a block of nine pixels. The processor units having access only to this information nevertheless obtain benefit from the data, namely an image that is three times smaller. A processor unit that also has access to the FP-D format can benefit from the reading of eight AG in total, the other AG enabling it, for example, to add the difference relative to the average to determine the values of the pixels of the block (this is the Haar wavelet principle).

Header (FunctionKey)

According to an essential feature of the invention, the header is the first word of any message on the bus α and mainly defines the function addressed. Preferably, although not necessarily, this header also defines:

the parallel format of the message, the serial format of the message, the color of the processor unit that generated the message (master processor unit), and qualitative information on the length of the message.

Function

The term "function" refers to any function or task that can be executed automatically by a processor unit connected to the bus α.

Table of Functions

Each processor unit is configured to include a table of functions that is specific to it and which associates each task that can be executed by the processor unit with a header value. The table preferably also defines the serial format (FS) associated with each function and the length of a message associated with that function. For a given processor unit, the number of functions available depends only on the number of AG that it can reach on the bus and on the value of the AG.

General Remarks on the Communication Protocol Conforming to the Invention

Messages are exchanged on the bus α between a master processor unit that has taken control of the bus, and which is accordingly the only processor unit authorized to write data on the bus α, and the other, slave processor units, which can only read the bus α.

When a processor unit 1a, 1b, . . . , 1n has taken control of the bus α, it starts by writing a header (FunctionKey) on the bus, followed by a frame comprising one or more words, depending on the serial format (FS) used.

Each slave processor unit reads the header, mainly to enable each slave processor unit to determine if the frame sent on the bus α is addressed to it and, if so, which task it must execute.

If the header sent on the bus α is not in the table of functions of a slave processor unit, the latter unit ignores the frame sent on the bus after the header. Otherwise, the slave processor unit also reads the frame sent on the bus after the header and automatically executes the task that is associated with that header in its table of functions.

Thus the novelty of the communication protocol of the invention stems from the fact that when a master processor unit writes a message on the bus it is not a given slave processor unit whose location on the bus is identified by a (physical or logical) address that is addressed, but rather functions (tasks) of the slave processor units, the message being processed in parallel by all of the processor units having a function associated with the header sent on the bus.

Example of the Structure of a Processor Unit (1a, . . . , 1n)

Referring to FIG. 1, a processor unit 1a, 1b, . . . , 1n essentially includes:

a microprocessor 2, a validation memory 3, a FIFO memory 4, a logic unit 5 for sequencing the operation of the validation memory 3 and the FIFO memory 4 using clock signals CLKA and CLKD, a data bus 6 referred to hereinafter as the interface bus, an internal bus 7 on which the microprocessor 2 can read or write data, 3-state registers 6a which, under the control of the microprocessor 2 (signal 8) write data present on the internal bus 7 on the interface bus 6 (D0–D15).

Interface Bus (6)

This interface bus is an n-bit data bus (D0–Dn−1) generally comprising n parallel electrical conductors, where n is an integer less than or equal to q (the size of the bus α), connected in parallel to the first n conductors of the bus α.

Microprocessor (2)/Internal Bus (7)

The microprocessor is associated in the usual way with a random access memory (RAM) which, for simplicity, is not shown in FIG. 1 and which the microprocessor 2 can read and write, in the usual manner. The random access memory includes the table of functions of the processor unit and the operating program of the microprocessor, to be described in detail later.

Figure 3:
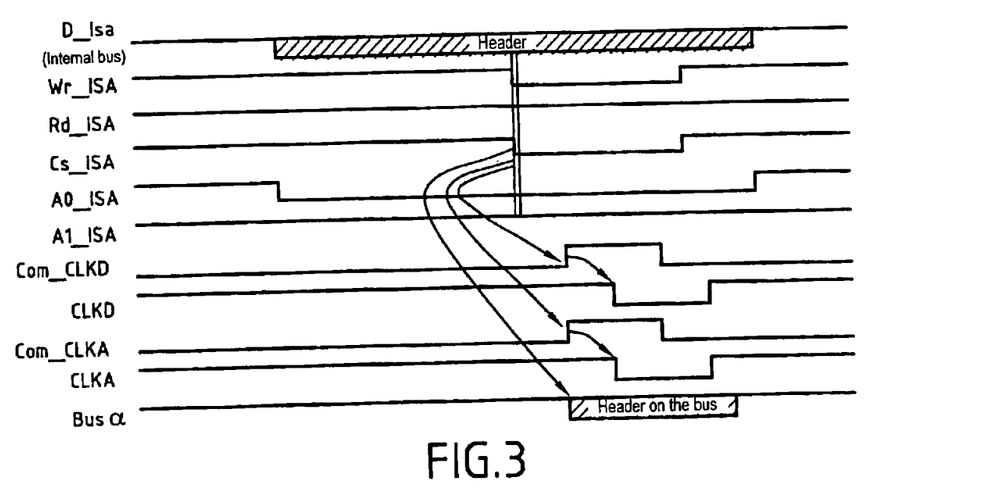
FIG. 3 is a timing diagram of the main signals involved in a master processor unit writing a header on the bus α.
Figure 4:
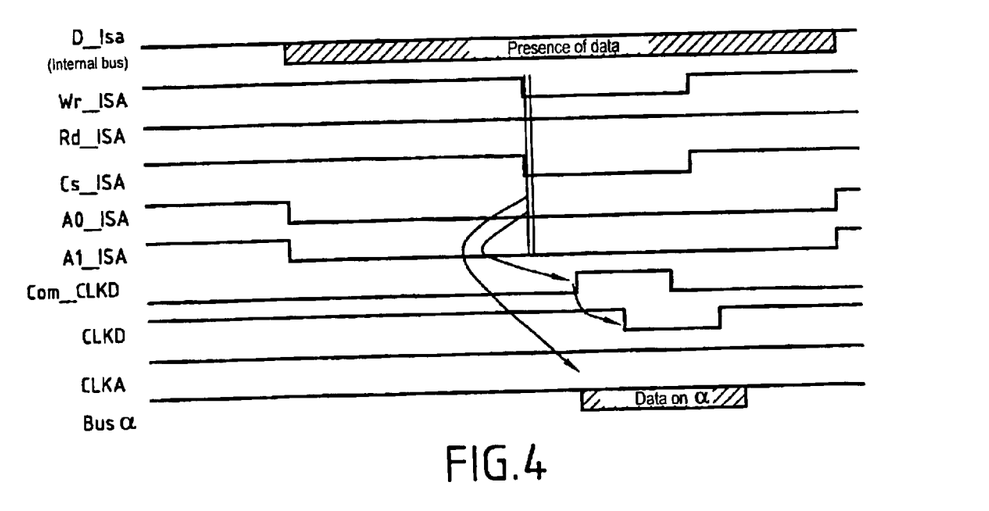
FIG. 4 is a timing diagram of the main signals involved in the master processor unit writing a word of a frame on the bus α.

The internal bus 7 is an ISA bus including, in the usual way:

a data bus (a 16-bit (D_ISA0 to D_ISA15) data bus in the case of the 16-bit processor unit 1a), an address bus, not shown in the FIG. 1 general block diagram, and whose two LSB address bits are respectively labeled A0_ISA and A1_ISA in the FIGS. 3 and 4 timing diagrams, and a control bus carrying the write signal Wr_ISA and the read signal Rd_ISA derived by the microprocessor 2 and the selection signal Cs_ISA obtained by decoding the read and write signals; these signals Wr_ISA, Rd_ISA and Cs_ISA are not shown in the FIG. 1 flowchart, and appear only in the FIGS. 3 and 4 timing diagrams.

Validation Memory (3)

The validation memory 3 can be either a random access memory or a read only memory. It is preferably an EEPROM. The validation memory functions as a correspondence table listing valid headers, the address port of the validation memory 3 being connected to the bus α. The output port of the validation memory 3 is connected (signals 9) to the microprocessor 2, at a port of the microprocessor dedicated to processing interrupts.

Reading the validation memory 3 is sequenced by the signal 5a derived by the logic unit 5 from the clock signals CLKA and CLKD.

As emerges more clearly below in the description, the function of the validation memory 3 is to validate or not (signals 9) a header present on the bus α for the microprocessor 2. To this end, at each address of the validation memory, corresponding to a header value that can be sent by a processor unit on the bus α, is stored a data item that is recognized by the microprocessor 2 as being either a header validation data item or a header non-validation data item. If the data item delivered at the output of the validation memory 3 (signals 9) is a validation data item, the microprocessor 2 is informed that it must load the frame that is sent on the bus α after the header that has been validated. Conversely, if the data item from the validation memory does not validate the header, the microprocessor 2 ignores the frame that is sent on the bus α after the header.

Validation or non-validation for each address of the memory 3 is specific to each processor unit 1*a*, 1*b*, . . . , 1*n* and is used to customize the operation of the processor unit.

Figure 2:
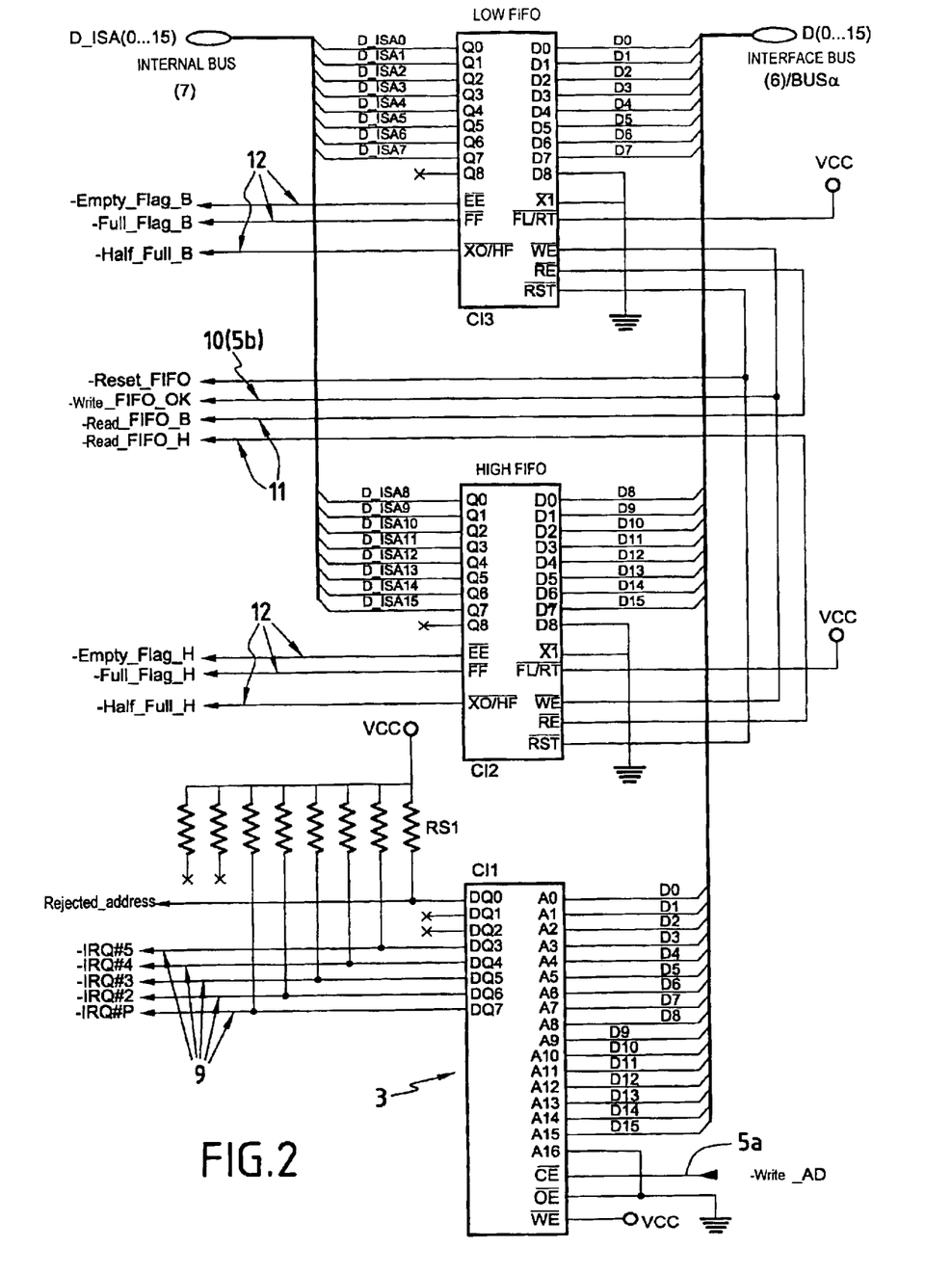
FIG. 2 is a detailed electrical circuit diagram of a FIFO memory and a validation memory of a processor unit.

Referring to FIG. 2, in one particular embodiment, the validation memory 3 employs an integrated circuit CI1, for example an AM29F010. In this embodiment, the address port of the memory corresponds to the inputs A0 to A15 respectively connected in parallel to the electrical conductors (D0–D15) of the bus α. The signal "Write_Ad" corresponds to the signal 5*a* in FIG. 1, and the signals "Rejected_Address", "IRQ#5", "IRQ#4", "IRQ#3", "IRQ#2", and "IRQ#P" at the output port of the memory correspond to the signals 9 previously referred to in connection with the FIG. 1 block diagram. In this embodiment, validation of the memory is distributed over a plurality of levels, but the useful validation is coded on the signal IRQ#P. If this signal IRQ#P is in the low state (respectively the high state), for example, the header that is present on the bus α is validated (respectively not validated) for the microprocessor 2.

FIFO Memory (4)

Referring to FIG. 1, the input of the FIFO memory 4 is connected to the bus α via the interface bus 6 and its output is connected to the data bus of the internal bus 7. The microprocessor 2 can command the loading into the FIFO memory 4 of a word present on the bus α by means of the write signal 10 and the extraction of a word stored in the FIFO memory 4 and its writing on the data bus of the internal bus 7 by means of the read signal 11. The sequencing of writing a word into the FIFO memory 4 or reading a word in the FIFO memory 4 is synchronized by a timing signal 5*b* derived by the logic unit 5 from the clock signals CLKA and CLKD. The FIFO memory 4 also delivers at its output the microprocessor 2 status signals 12 indicating how full it is to the microprocessor 2.

Referring to FIG. 2, in one particular embodiment, the FIFO memory 4 is constructed from two 8-bit integrated circuits CI2 and CI3, for example IDT7200 integrated circuits, each of which is dedicated to storing the more significant bits (D8 to D15) and the less significant bits (D0 to D7) of the bus α, respectively.

In this embodiment, the FIG. 2 signals "Empty_flag_H", "Full_flag_H", "Half_full_H", "Empty_flag_B", "Full_flag_B", "Half_full_B" correspond to the status signals 12 previously referred to in connection with the FIG. 1 block diagram, and are used to code the fullness status of each FIFO register (CI2 and CI3). The signal "Write_FIFO_OK" corresponds to the write signal 10 previously referred to in connection with FIG. 1. The signals "Read_FIFO_B" and "Read_FIFO_H" correspond to the read signal 11 previously referred to in connection with FIG. 1. The signal "Reset_FIFO" is a signal for resetting the FIFO memory to zero and is delivered by the microprocessor 2 and used to initialize the memory 4.

3-State Registers (6*a*)

The data bus of the internal bus 7 of a processor unit is connected in parallel to the interface bus 6 via one or more 3-state registers 6*a*. For example, in the case of the processor unit 1*a* implementing a 16-bit internal bus (D_ISA0–D_ISA15), two 8-bit registers dedicated to writing could be used in parallel on the interface bus 6, and likewise on the bus α, respectively for the eight less significant bits (D_ISA0–D_ISA7) and the eight more significant bits (D_ISA8–D_ISA15) of the data bus of the internal bus 7. The transfer onto the bus α (D0–D15) of data present on the data bus (D_ISA0–D_ISA15) of the internal bus 7 is commanded by the microprocessor by means of the write signal 8 (FIG. 1).

Clock Signals CLKA and CLKD

Referring to FIG. 1, each microprocessor 2 of a processor unit delivers at its output two clock signals 2*a* and 2*b* which are connected via open-collector ports 13 to a clock bus (CLKA, CLKD common to all the processor units. When a processor unit takes control of the bus α (thereby becoming the master processor unit) the clock signals CLKA and CLKD respectively correspond to the clock signals 2*a* and 2*b* of the microprocessor 2 of the master processor unit; the clock signals 2*a* and 2*b* of the other, slave processor units are floating and isolated from the clock bus CLKA, CLKD. Thus the exchange of data on the bus α is timed by the master processor unit and the slave processor units handle the loading of messages written onto the bus α (validation memory 3/signal 5*a*; FIFO memory 4/signal 5*b*), regardless of their own clock speed (the operating frequency of their own microprocessor 2). This has the advantage that processor units having different clock speeds can communicate with each other.

Operation of the Microprocessor (2) of a Processor Unit

Main Program

The microprocessor 2 of a processor unit is programmed to execute the following main program loop:

a) read a message (header and frame) in the FIFO memory 4, b) decode the function associated with the header in the functions table, and c) execute automatically the routine (task) corresponding to the function.

Writing a Message on the Bus α (FIGS. 3 and 4)

During execution of the routine of step c), it may happen that the microprocessor 2 is called upon to write a message on the bus α to activate a function managed by one or more other processor units connected to the bus α. In this case, after taking control of the bus α, the processor unit writes on the bus the header coding the function and the word frame of the message, and then releases the bus. FIGS. 3 and 4 are timing diagrams for the main signals used in this kind of write operation.

In FIGS. 3 and 4, the signals "Data_Isa" correspond to the data bus of the internal bus 7, i.e. to the bits D_ISA0 to D_ISA15 (FIG. 2) of the internal bus 7 of the processor unit 1, for example. The signals "Com_CLKA" and "Com_CLKB" correspond to the signals 2*a* and 2*b* previously cited. A header is written on the data bus of the internal bus 7 at the base address+offset 2; afterwards the data is written on the data bus of the internal bus 7 at the base address+offset 3 (cf. signals A0_ISA and A1_ISA).

Figure 5:
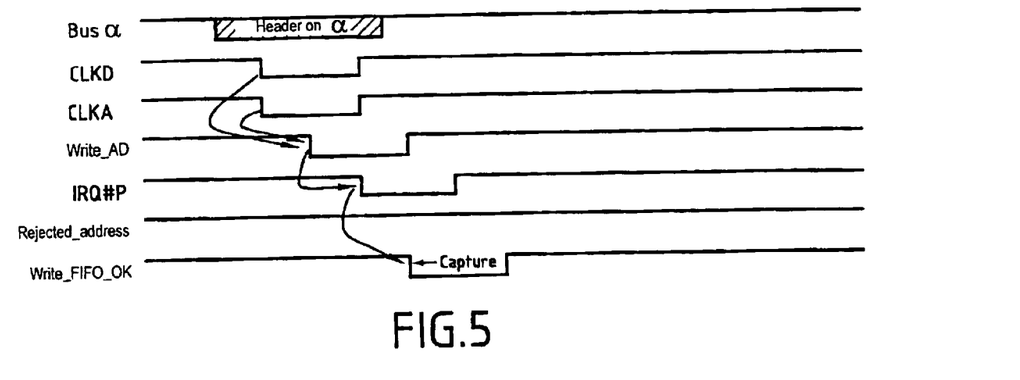
FIG. 5 is a timing diagram of the main signals involved in a slave processor unit reading a valid header present on the bus α.
Figure 6:
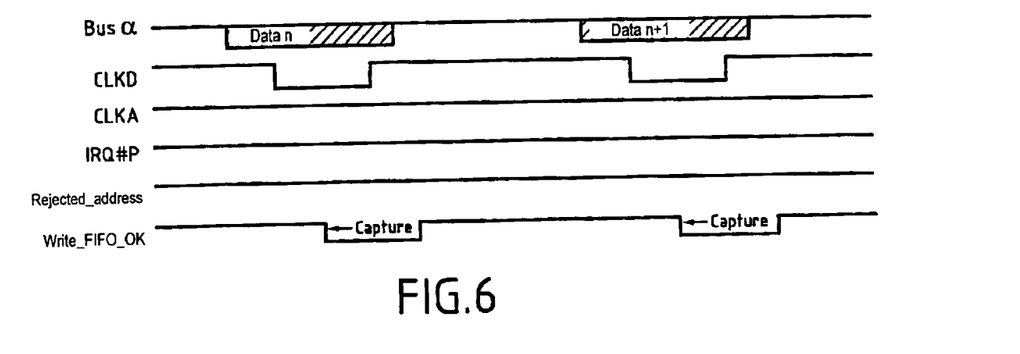
FIG. 6 is a timing diagram of the main signals operative in a slave processor unit after it has received a valid header and involved in the master processor unit writing a word frame on the bus α.

Loading a Message Present on the Bus α (FIGS. 5 and 6)

If a valid header is present on the bus α, execution of the main program previously cited is interrupted by the validation data delivered by the validation memory (the signal "IRQ#P" changes state). The microprocessor then executes a secondary routine for loading into the FIFO memory 4 the header and the word frame sent on the bus α after the header, the corresponding processor unit operating in slave mode.

FIG. 5 shows timing diagrams of the main signals used during writing of a valid header on the bus α by a slave processor unit. FIG. 6 shows the timing diagrams of the main signals used during reading on the bus α by a slave processor unit of a frame of words (FIG. 6/"Data n", Data n+1") written on the bus by a master processor unit and relating to a valid header previously written on the bus.

Referring to FIG. 5, in the case of a valid header for the slave processor unit, at the output of the validation memory 3, the interrupt IRQ#P changes state momentarily. The valid header is captured in the FIFO memory 4 (signal 10/Write__FIFO__OK) by the simultaneous action of the signals CLKA and CLKD.

Referring to FIG. 6, the capture of data in the FIFO memory 4 is timed only by the signal CLKD.

Figure 7:
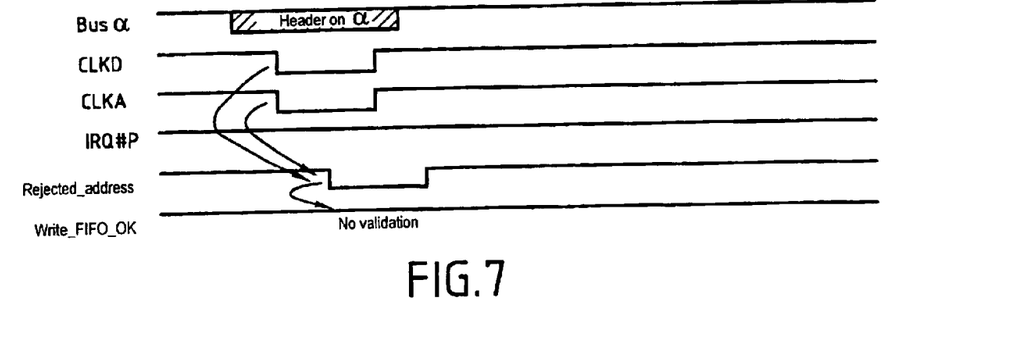
FIG. 7 is a timing diagram of the main signals operative in a slave processor unit after it has received an invalid header and involved in the master processor unit writing a word frame on the bus α.

Reception of an Invalid Header/FIG. 7

Referring to FIG. 7, if the header present on the bus α is not valid for a slave processor unit, the interrupt signal IRQ#P does not change state and the main program of the microprocessor 2 is not interrupted. The microprocessor 2 does not command the loading of the header present on the bus α into the FIFO memory 4 (the signal Write__FIFO__OK does not change state) or the subsequent loading into the FIFO memory 4 of the word frame on the bus after the header. Thus the slave processor unit ignores the message on the bus α.

The multiprocessor architecture described with reference to FIGS. 1 to 7 has the following main advantages:

- The principle of addressing processor units by their functions using the header (FunctionKey) simplifies the management of parallel execution of tasks by the processor units, and thereby simplifies the programming of the processor units; furthermore, it produces a powerful architecture at lower cost, using low-power processor units.
- The architecture has the advantage of being modular and very easy to modify; it is also very robust: its form can be changed "hot" (in operation) by adding, removing or replacing a processor unit, without greatly disturbing the execution of the general operating system of the architecture; some processor units that constitute that architecture can therefore fail without it being necessary to stop the operation of the architecture as a whole.
- This parallel architecture is "universal": it provides communication between different processor units, in particular processor units having data buses (interface bus 6) of different sizes; the only limitation on the size of the processor units that can be connected is the number of bits in parallel on the bus α; this architecture is not restricted to only one data format, but works with any data format equal to or exceeding the size of the atom of granularity (AG).
- Because the exchange of data on the communication bus (bus α) is timed by the master processor unit that has taken control of the bus (signals CLKA and CLKD), the processor units can communicate with each other regardless of their processors and above all regardless of the clock rate of their processors.

Application Example

A robot has been produced including a backplane mother card on which are mounted five daughter cards each corresponding to a processor unit: a propulsion card to control the movement of the robot, a sound card, a video camera card, and a behavioral decision (computer) card which controls the behavior of the robot. Tables 1, 2, 3, 4 below set out an example of the headers and the associated functions.

TABLE 1

| Header and data | Function | Propulsion card |
|---|---|---|
| 0 | Reserved | ⇓:Never |
| | | ⇑:Never |

TABLE 1-continued

| Header and data | Function | Propulsion card |
|---|---|---|
| 1 | Emergency stop | ⇓:Motor overheating |
| | | ⇑:Always |
| 2 speed | Request to move forward | ⇓:Never |
| | | ⇑:Always |
| 3 speed | Request to move backward | ⇓:Never |
| | | ⇑:Always |
| 4 number | Request to transmit an image | ⇓:Never |
| | | ⇑:Never |
| 5 image | Transmission of an image | ⇓:Never |
| | | ⇑:Never |
| 6 name | Recognition of a human | ⇓:Never |
| | | ⇑:Always (slow down) |
| 7 number | Emit a sound | ⇓:Never |
| | | ⇑:Never |
| 8 sound | Transmission of a sound | ⇓:Never |
| | | ⇑:Never |
| 9 reason identifier | Card extinction | ⇓:Battery dead/fault |
| | | ⇑:Never |
| 10 | Request for identification of cards present | ⇓:Never |
| | | ⇑:Always |
| 11 function identifier | Declaration of its presence and its function | ⇓:On demand (10) |
| | | ⇑:Never |

TABLE 2

| Header and data | Function | video Camera card |
|---|---|---|
| 0 | Reserved | ⇓:Never |
| | | ⇑:Never |
| 1 | Emergency stop | ⇓:Obstacle detected |
| | | ⇑:Never |
| 2 speed | Request to move forward | ⇓:Never |
| | | ⇑:Never |
| 3 speed | Request to move backward | ⇓:Never |
| | | ⇑:Never |
| 4 number | Request to transmit an image | ⇓:Possibly |
| | | ⇑:Always |
| 5 image | Transmission of an image | ⇓:On demand (4) |
| | | ⇑:Always |
| 6 name | Recognition of a human | ⇓:On recognition |
| | | ⇑:Always |
| 7 number | Emit a sound | ⇓:Never |
| | | ⇑:Never |
| 8 sound | Transmission of a sound | ⇓:Never |
| | | ⇑:Never |
| 9 reason identifier | Card extinction | ⇓:Battery dead/fault |
| | | ⇑:Never |
| 10 | Request for identification of cards present | ⇓:Never |
| | | ⇑:Always |
| 11 function identifier | Declaration of its presence and its function | ⇓:On demand (10) |
| | | ⇑:Never |

TABLE 3

| Header and data | Function | Sound card (Mic/LS) |
|---|---|---|
| 0 | Reserved | ⇓:Never |
| | | ⇑:Never |
| 1 | Emergency stop | ⇓:Never |
| | | ⇑:Always (warning sound) |
| 2 speed | Request to move forward | ⇓:Never |
| | | ⇑:Never |
| 3 speed | Request to move backward | ⇓:Never |
| | | ⇑:Never |
| 4 number | Request to transmit an image | ⇓:Never |
| | | ⇑:Never |
| 5 | Transmission of an | ⇓:Never |

TABLE 3-continued

| Header and data | Function | Sound card (Mic/LS) |
| --- | --- | --- |
| image | image | ⇑:Never |
| 6 name | Recognition of a human | ⇓:On recognition ⇑:Always |
| 7 number | Emit a sound | ⇓:Never ⇑:Always |
| 8 sound | Transmission of a sound | ⇓:Possibly ⇑:Always |
| 9 reason identifier | Card extinction | ⇓:Battery dead/fault ⇑:Never |
| 10 | Request for identification of cards present | ⇓:Never ⇑:Always |
| 11 function identifier | Declaration of its presence and its function | ⇓:On demand (10) ⇑:Never |

TABLE 4

| Header and data | Function | Behavior decision card |
| --- | --- | --- |
| 0 | Reserved | ⇓:Never ⇑:Never |
| 1 | Emergency stop | ⇓:Choice of emergency stop ⇑:Always |
| 2 speed | Request to move forward | ⇓:Choice of going forward ⇑:Never |
| 3 speed | Request to move backward | ⇓:Choice of going backward ⇑:Never |
| 4 number | Request to transmit an image | ⇓:Request ⇑:Always |
| 5 image | Transmission of an image | ⇓:Choice of emergency stop ⇑:Always |
| 6 name | Recognition of a human | ⇓:Never ⇑:Always |
| 7 number | Emit a sound | ⇓:Choice of emitting a sound ⇑:Never |
| 8 sound | Transmission of a sound | ⇓:Request ⇑:Always |
| 9 reason identifier | Card extinction | ⇓:Battery dead/fault ⇑:Never |
| 10 | Request for identification of cards present | ⇓:Request ⇑:Always |
| 11 function identifier | Declaration of its presence and its function | ⇓:Never ⇑:Always |

⇓: ability of the card to write the header on the bus α.
⇑: ability of the card to load the header present on the bus α into the FIFO memory (header validity).

In this application, at least two processor units (daughter cards) are configured with the same header, i.e. have the same header value in their table of functions (see below the function "emergency stop": the propulsion card, sound card and behavior decision card are all configured with the same header value '1'). Also, in this application, at least one processor unit is adapted to execute a plurality of tasks and is configured so that each task is associated with a different header. For example, the propulsion card has in its functions table the header values '1', '2', '3', '6' and '10' respectively associated with the functions: "emergency stop", "request to move forward", "request to move backward", "recognition of a human", and "request for identification of cards present".

The "emergency stop" function will be further commented on to explain further the above tables.

"Emergency Stop" Function

The header of value '1' coding the "emergency stop" function is always valid for the propulsion card, the sound card and the behavior decision card. In the table of functions of the propulsion card this header value is associated with the "emergency stop" function and the associated routine (task) is stopping the drive motor of the robot.

In the table of functions of the sound card this header value '1' is associated with the "emergency stop" function and the associated routine is the emission of a warning sound by the card. In the table of functions of the behavior decision card this header value is associated with the "emergency stop" function and the associated routine stores and dates the event and verifies that the emergency stop has been effected by verifying that the video camera is observing a fixed image. When the header of value '1' is on the bus α, the routines (tasks) of each of these cards corresponding to this function are activated in parallel.

Conversely, the header of value '1' coding the "emergency stop" function is never valid for the video camera card. If this header is present on the bus α, the video camera card ignores the corresponding message and continues to function normally.

Activating the "emergency stop" function by writing the header value '1' on the bus α can be effected at the initiative of the propulsion card (if it detects overheating of the motor), or the video camera card (if it detects an obstacle), or the behavior decision card. The "emergency stop" function is never triggered at the initiative of the sound card.

The above tables enable the person skilled in the art to define the table of functions for each card and the content of its validation memory 3 that decodes the headers.

In the particular embodiment shown in FIG. 1, after recognizing a valid header, a processor unit loads the message on the bus α into the FIFO memory 4 before executing the task associated with the header of the message. However, in a simpler embodiment, a processor unit that executes a task associated with a header after recognizing that header on the bus α and without previously loading the message into local memory can be envisaged. In this case, the processor unit does not necessarily include a FIFO memory 4. Equally, in another embodiment, the validation memory 3 could be replaced by any other means of decoding headers on the bus, for example a decoding table implemented in combinatorial logic.

What is claimed is:

1. A parallel electronic architecture comprising a plurality of processor units connected to a communication bus and each adapted to execute automatically one or more predefined tasks, which architecture is characterized in that each processor unit is configured so that each of its tasks is associated with a header, each processor unit is adapted to communicate with the other processor units using the following protocol: sending on the bus a message comprising a header characterizing a function, and possibly a frame consisting of one or more words, and each processor unit is adapted to decode each header on the bus and, as a function of the value of said header, either to ignore the message on the bus or to execute the task associated with the header of said message.

2. An architecture according to claim 1, wherein a processor unit is adapted to load the message on the bus into memory before executing a task.

3. An architecture according to claim 1, wherein two or more processor units are configured with the same header.

4. An architecture according to claim 1, wherein a processor unit is adapted to execute a plurality of tasks and is configured so that each task is associated with a different header.

5. An architecture according to claim 1, wherein the communication bus is a data bus comprising q parallel conductors (where q is an integer greater than or equal to 1) and each processor unit includes a data bus of n bits (where n is an integer less than or equal to q) that is connected in parallel to the n first conductors of the communication bus.

6. An architecture according to claim 1, the architecture being of the multimaster/multislave type and the exchange of data on the communication bus is timed by the master processor unit that sent the message.

7. An architecture according to claim 1, wherein a processor unit includes: a processor programmed to execute one or more separate tasks, the coding means adapted to validate or not a header in transit on the communication bus for the processor, and a memory which is connected to the communication bus, is accessible in read mode by the processor, and loads a message on the communication bus under the control of the processor.

8. An architecture according to claim 7, wherein the decoding means include a validation memory whose address port is connected to the communication bus, each header value on the communication bus corresponds to an address of said validation memory, and each address of said validation memory corresponding to a header stores header validation or non-validation data.

9. An architecture according to claim 8, wherein the output port of the validation memory is connected to a port of the processor dedicated to processing interrupts.

10. An architecture according to claim 9, wherein a processor unit is adapted to send on the bus with the following serial format: writing on the bus a first word corresponding to the header and then writing successively each word constituting the frame of the message.

* * * * *